UNITED STATES PATENT OFFICE.

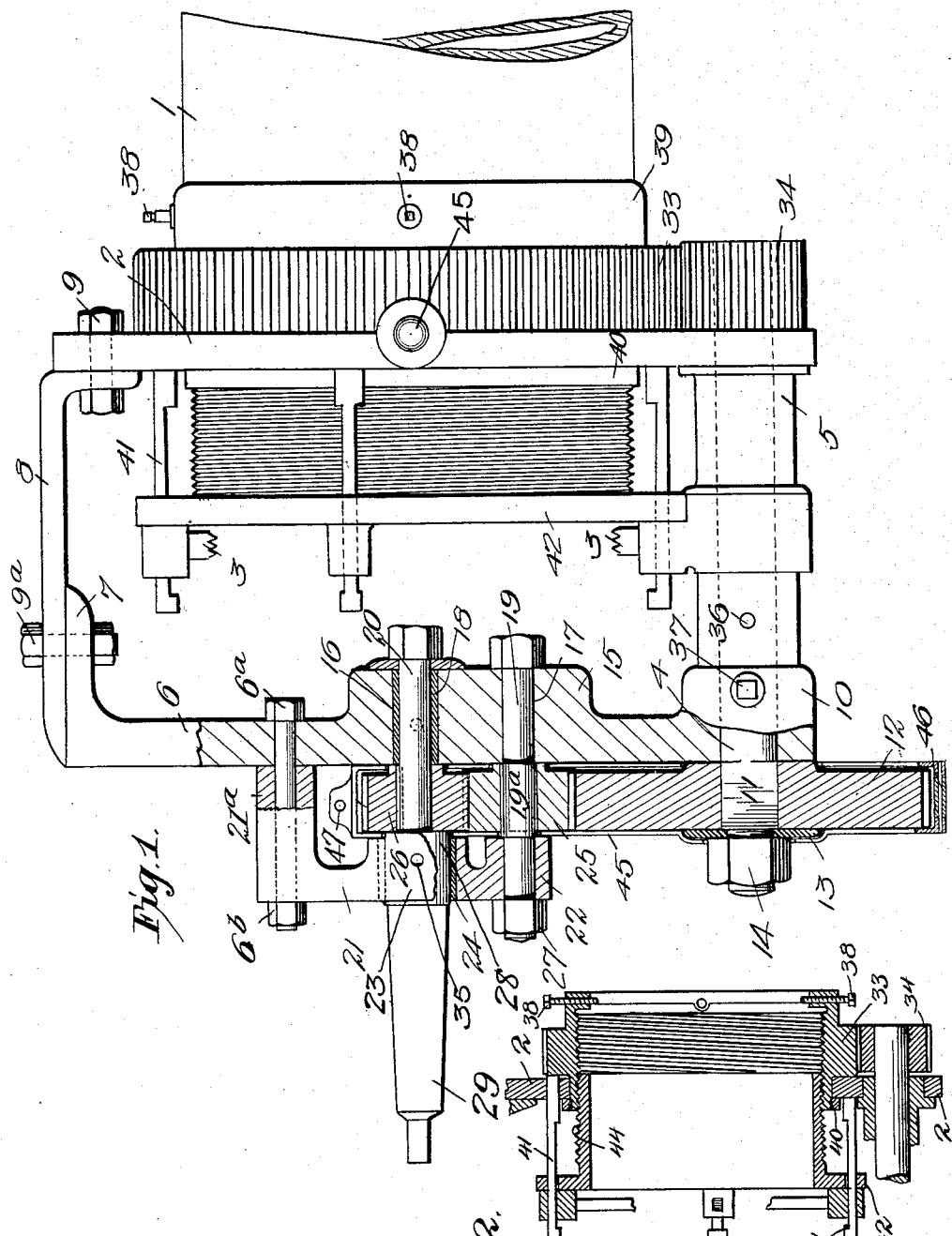

WILLIAM EDWARD NESTOR, OF MOORINGSPORT, LOUISIANA.

PIPE-THREADING MACHINE.

1,177,436. Specification of Letters Patent. Patented Mar. 28, 1916.

Application filed December 28, 1914. Serial No. 879,290.

*To all whom it may concern:*

Be it known that I, WILLIAM E. NESTOR, a citizen of the United States, and a resident of Mooringsport, in the parish of Caddo and State of Louisiana, have invented a new and useful Improvement in Pipe-Threading Machines, of which the following is a specification.

My invention is an improvement in pipe threading machines, and has for its object to provide a portable machine of the character specified, especially adapted for cutting threads on large pipes at the place of their utilization, and wherein the machine may be operated manually, being placed directly on the pipe.

In the drawings:—Figure 1 is a side view of the improved machine with parts in section, and Fig. 2 is a vertical section through the work holder and die head.

The present embodiment of the invention is shown in connection with a pipe 1, the taper pin plate 2 fitting over the pipe as shown, and the thread cutting mechanisms 3 of ordinary construction, are supported by the driving plate in the usual manner. This mechanism is driven by a shaft 4, which is journaled in a tubular extension 5, connected with the plate 2, and mechanism supported by the plate 2 and the extension 5 is provided for driving the shaft 4.

A bearing bracket or arm 6 is connected to the plate 2 and the extension, the bracket having at its upper end an angular lug 7, which is connected to the plate 2, by means of an angular brace 8. This brace consists of two portions at approximately a right angle to each other, one portion being connected to the driving plate by a bolt and nut 9, while the other portion is connected to the lug 7 by a similar bolt and nut $9^a$.

The bracket arm is provided with a bearing 10 for the shaft 4, the inner end of the said bearing fitting against the outer end of the extension 5 and beyond the bearing 10 the shaft 4 is provided with a squared portion 11, upon which fits the hub of a gear wheel 12. The gear wheel is held in place by means of a washer 13, and a nut 14, and the bracket 6 is provided with an enlargement 15, intermediate its ends and on its inner face. At the enlargement the bracket has bearings 16 and 17, the former having a bushing 18 fitting therein.

An idler shaft 19 is held in the bearing 17, and a driving shaft 20 is held in the bushing 18. A second bracket 21 is provided for assisting in the support of the shafts 19 and 20, and the said bracket has an extension $21^a$, which engages the outer face of the bracket 6 above the driving shaft 20 to space the body of the bracket away from the bracket 6.

A bolt $6^a$ is passed through registering openings in the bracket 6 and in the extension $21^a$, and the bolt is engaged by a nut $6^b$, to clamp the bracket 21 to the bracket 6. This bracket 21 is provided with bearings 22 and 23, for receiving the shafts 19 and 20, respectively, and the latter bearing has a bushing 24.

A pinion 25 is journaled on the shaft 19, and a pinion 26 is keyed to the shaft 20, both pinions being between the brackets 6 and 21, the former pinion being arranged on an enlarged portion $19^a$ of the shaft 19. The shoulders formed at each end of the enlarged portion $19^a$ of the shaft 19 engage the outer face of the brackets and the inner end of the bearing 22, respectively, to properly space the lower end of the bracket 21 from the bracket 6. The gear 25, it will be seen, has an opening for the enlargement $19^a$ of the shaft 19 somewhat greater than the diameter of the said enlargement, in order to provide proper clearance and there is also a sufficient clearance between the bracket 22 and the bracket 6 to permit the free turning of the pinion. At its inner end the shaft 19 is provided with a head, and its outer end has threaded thereon a nut 27 to hold the parts in proper relative position.

The bearing 23 to the driving shaft 20 has an enlarged portion 28 fitting the bushing, and beyond the bearing the driving shaft is provided with a reduced tapering shank 29. The shoulder between the enlarged portion 28 and the body of the shank 20 engages the outer end of the pinion 26 and the inner end of the hub of the pinion engages the outer face of the bracket 6 to prevent inward movement of the shaft, and a washer 30 and a nut 31 are arranged on the inner end of the shaft to prevent outward movement thereof.

The gear wheel 33 is integral with the work holder 39 and the said work holder 39 is provided with set screws 38 for permitting the work holder to be clamped on the pipe 1. The die head 42 and the lead screw 44 are also integral and the work holder and the gear 33 are threaded internally to receive the lead screw 44. The work holder and gear are turned to a free or running fit on the opposite side of the gear 33 from the set screws 38 to receive the taper pin plate 2. The said portion of the gear wheel 33 and the work holder 39 are threaded to receive the pin plate retaining ring 40, said ring holding the taper pin in place. The integral die head 42 and lead screw 44 are slipped over the pinion sleeve 5 and over the taper pins 41 and the said pins engage at their inner ends with the taper pin plate 2. Both the die head 42 and the taper pin plate 2 are held on the sleeve 5, through which the pinion shaft 4 extends and which carries the pinion 34, and these parts are carried around the work as the pinion 34 rotates or revolves around the gear 33 which is fixed. The die head 42 being a free fit over the pinion sleeve 5 is free to travel back and forth on the same, as the lead screws draw the dies on or off the pipe 1, as well as to assist in driving the dies in connection with the taper pin plate 2. The bearings 16, 17, 23 and 22 have oil holes 35, for permitting the parts to be lubricated and the extension 5 has an oil hole 36 for the same purpose. Oppositely arranged handles 45 are provided for carrying the machine, but one of the said handles being shown.

In operation the machine is slipped over the pipe to be threaded until the end of the pipe is even with the dies 3. The set screws 38 are then turned to clamp the work holder 39 of the die on the pipe 1. The lead screw is provided with as many threads per inch as the pipe to be threaded, and the taper pin plate 2 is bored to a running fit over the bearing 40 of the large gear 33. On the driving plate are mounted the four taper pins 41, against which the backs of the dies 3 rest, and which permit the dies to recede as the lead screw feeds them on the pipe, thus giving the proper taper to the threaded end of the pipe. The bearing sleeve 5 is threaded into an opening in the plate 2, and the plate 42 is mounted on this sleeve as is also the bearing 10 of the arm 6.

The set screw 37 holds the bearing in adjusted position with respect to the bearing sleeve 5, this set screw engaging the outer surface of the sleeve. At the opposite end the arm 6 is held by the angular brace 8, so that the driving strain is divided at the opposite sides of the driving plate.

The driving mechanism is connected with the taper shank 23, and as the shank turns the pinion 26 turns therewith, driving the pinion 25 and the gear wheel 12. The shaft 4 turning rotates the pinion 34 and since the gear wheel 33 is fixed to the pipe the arm 6 and the die plate will rotate about the pipe, rotating on the axis of the pipe, and the die plate will cause the dies 3 to cut the threads on the pipe. Thus the hand operated machine is converted into a power operated machine, the power being applied at the taper shank.

Preferably the gear mechanism 12—25 and 26 is inclosed by a sectional casing, consisting of sections hinged together to permit the casing to be placed over the gearing, or to be removed therefrom. But a single section 45 is shown, and the said section is hinged at 46 to the other section. The sections are similar, and when in closed position they completely inclose the gearing. Each section has a perforated lug 47 adapted to receive a bolt or the like for holding the sections together. The casing 45 is shaped to fit the gears.

It will be noted that the die head 42 carries and supports the dies 3 and in addition assists in driving them in connection with the taper pin plate 2. The taper pin plate 2 supports the taper pins 41, the pinion sleeve 5, the pinion 34, the pinion shaft 4, the brackets or arms 10 and 22, the gears 12, 25 and 26, the drive shaft 20, the shaft 19$^a$, the bolt 6$^a$, the support 8 and the gear cover 45, and assists in driving the dies in connection with the die holder 42.

I claim:—

1. A pipe threading machine, comprising a work holder adapted to be clamped to the pipe and provided with an annular series of gear teeth, a lead screw carrying threading dies and having a threaded engagement with the work holder, a taper pin plate journaled for rotation on the work holder and controlling the recession of the dies, a bearing sleeve supported by the taper pin plate, and having its axis parallel with that of the pipe, an operating shaft journaled in the bearing sleeve and provided with a pinion meshing with the gear teeth, a bracket arm having a bearing at one end for engaging the outer end of the bearing sleeve and having at the other end a lug extending toward the taper pin plate, a brace connected at one end to the lug and at the other end to the taper pin plate for supporting the opposite end of the bracket arm from the bearing sleeve, said bracket arm having a central bearing, and having a bearing between the central bearing and the operating shaft, a driving shaft journaled in the central bearing and provided with a taper shank for engagement by operating mechanism, a countershaft journaled in the other bearing, pinions secured to the driving shaft and the countershaft and intermeshing with each other, a gear wheel secured to the operating shaft and meshing with the pinion of the countershaft, and a support connected with the driving arm and having bearings for the driving shaft and the countershaft and on the opposite sides of the pinions from the bracket arm.

2. A pipe threading machine, comprising a work holder adapted to be clamped to the pipe and provided with an annular series of gear teeth, a lead screw carrying threading dies and having a threaded engagement with the work holder, a taper pin plate journaled for rotation on the work holder and controlling the recession of the threading dies, a bearing sleeve supported by the taper pin plate and having its axis parallel with that of the pipe, an operating shaft journaled in the bearing sleeve and provided with a pinion meshing with the gear teeth, a bracket arm having a bearing at one end for engaging the outer end of the bearing sleeve and having at the other end a lug extending toward the taper pin plate, a brace connected at one end to the lug and at the other end to the taper pin plate for supporting the opposite end of the bracket arm from the bearing sleeve, said bracket arm having a central bearing, and having a bearing between the central bearing and the operating shaft, a driving shaft journaled in the central bearing and provided with a taper shank for engagement by operating mechanism, a countershaft journaled in the other bearing, pinions secured to the driving shaft and the countershaft and intermeshing with each other, and a gear wheel secured to the operating shaft and meshing with the pinion of the countershaft.

3. A pipe threading machine, comprising a work holder adapted to be clamped to the pipe and provided with an annular series of gear teeth, a lead screw carrying threading dies and having a threaded engagement with the work holder, a taper pin plate journaled for rotation on the work holder and controlling the recession of the threading dies, a bearing sleeve supported by the taper pin plate, and having its axis parallel with that of the pipe, an operating shaft journaled in the bearing sleeve and provided with a pinion meshing with the gear teeth, a bracket arm having at one end a bearing for engaging the outer end of the bearing sleeve, a brace connecting the opposite end of the bracket arm to the taper pin plate, a driving shaft journaled in the bracket arm coaxial with the pipe to be threaded, a countershaft journaled in the bracket arm between the driving shaft and the operating shaft, and a gearing connection between the driving shaft, the countershaft and the operating shaft.

4. A pipe threading machine, comprising in combination with the work holder adapted to be clamped on the pipe and having an annuler series of gear teeth, the lead screw having a threaded engagement with the work holder and carrying threading dies, a taper pin plate journaled for rotation on the frame and controlling the recession of the threading dies, a bearing sleeve supported by the taper pin plate with its axis parallel to that of the pipe, the operating shaft journaled in the bearing sleeve and having the pinion meshing with the gear teeth, a bracket arm connected detachably at one end with the bearing sleeve and at the other with the taper pin plate, a driving shaft journaled in the bracket arm coaxial with the pipe, and provided with means for engagement by operating means to turn the shaft and a reducing gear connection between the driving shaft and the operating shaft.

5. A pipe threading machine, comprising a work holder having means for engaging the pipe to be threaded and provided with a gear ring rigid therewith, a lead screw having threaded engagement with the work holder and carrying threading dies, a taper pin plate journaled to rotate on the work holder and controlling the recession of the dies, said plate and work holder having interengaging feeding means, said plate having a bearing sleeve, a driving shaft journaled in the sleeve and having a pinion for engaging the gear ring, a bracket connected with the sleeve and with the plate and supporting an operating shaft, and a gear connection between the said shaft and the driving shaft.

WILLIAM EDWARD NESTOR.

Witnesses:
C. H. TABER,
J. A. WALDEN.

Copies of this patent may be obtained for five cents each, by addressing the "Commissioner of Patents, Washington, D. C."